United States Patent
Babala et al.

(10) Patent No.: US 8,650,930 B2
(45) Date of Patent: Feb. 18, 2014

(54) FAIL SAFE SELF TEST FOR MOTION SENSOR MODULES

(75) Inventors: Michael Babala, Plymouth, MI (US); Greg Morningstar, Canton, MI (US)

(73) Assignee: Kelsey-Hayes Company, Livonia, MI (US)

(*) Notice: Subject to any disclaimer, the term of this patent is extended or adjusted under 35 U.S.C. 154(b) by 32 days.

(21) Appl. No.: 13/055,759

(22) PCT Filed: Aug. 7, 2009

(86) PCT No.: PCT/US2009/053072
§ 371 (c)(1), (2), (4) Date: Feb. 15, 2011

(87) PCT Pub. No.: WO2010/017431
PCT Pub. Date: Feb. 11, 2010

(65) Prior Publication Data
US 2011/0146369 A1    Jun. 23, 2011

Related U.S. Application Data

(60) Provisional application No. 61/087,420, filed on Aug. 8, 2008, provisional application No. 61/107,797, filed on Oct. 23, 2008.

(51) Int. Cl.
*G01P 21/00* (2006.01)

(52) U.S. Cl.
USPC ........................................................ 73/1.38

(58) Field of Classification Search
None
See application file for complete search history.

(56) References Cited

U.S. PATENT DOCUMENTS

| | | | |
|---|---|---|---|
| 5,459,732 | A | 10/1995 | Wise et al. |
| 6,298,709 | B1 | 10/2001 | Artzner et al. |
| 6,497,146 | B1 | 12/2002 | Hobbs et al. |
| 6,792,792 | B2 | 9/2004 | Babala |
| 6,975,969 | B2 | 12/2005 | Sauler et al. |
| 7,307,561 | B2 | 12/2007 | Haag et al. |
| 2001/0009438 | A1 | 7/2001 | Kihara et al. |
| 2005/0167960 | A1 | 8/2005 | Tanaka et al. |
| 2008/0065295 | A1 | 3/2008 | Heilmann et al. |
| 2009/0277244 | A1 | 11/2009 | Doll et al. |

FOREIGN PATENT DOCUMENTS

| | | |
|---|---|---|
| DE | 19705406 A1 | 8/1998 |
| DE | 10022815 A1 | 11/2001 |
| DE | 10215405 A1 | 10/2003 |
| DE | 102004056416 A1 | 5/2006 |
| EP | 2088043 A1 | 8/2009 |
| WO | 2007064783 A1 | 6/2007 |

*Primary Examiner* — Robert R Raevis
(74) *Attorney, Agent, or Firm* — MacMillan, Sobanski & Todd, LLC

(57) ABSTRACT

A short duration test activation signal is applied to the test activation port of a motion sensor module and the test activation status port observed with an error flag being set if a corresponding signal does not appear at the test activation status port within a predetermined time period.

12 Claims, 5 Drawing Sheets

FAIL SAFE SELF TEST FOR MOTION SENSOR MODULES

BACKGROUND OF THE INVENTION

This invention relates in general to motion sensors and in particular to a fail safe test activation for motion sensor modules.

Electronic safety control systems for vehicles are becoming increasingly sophisticated. Such safety systems may include an Anti-Lock Brake System (ABS), a Traction Control (TC) System, a Vehicle Stability Control (VSC) System and airbag control units with rollover detection. The safety control system typically monitors vehicle motion parameters and is operable to selectively activate the vehicle wheel brakes and/or modify engine performance to avoid potential unwanted vehicle motions, such as, for example, a vehicle roll-over. The safety control system also may be operable to deploy airbags at an appropriate time. A plurality of motion sensors, such as accelerometers and angular rate sensors are utilized to sense vehicle motion. The signals generated by elements within the motion sensors are typically modified by a signal conditioning circuit and then provided to a microprocessor in an Electronic Control Unit (ECU) of the electronic safety control system. The ECU microprocessor utilizes a stored algorithm to monitor the vehicle motion parameters, and, upon detecting a potential vehicle stability problem or crash/rollover condition, the microprocessor initiates corrective action by selectively activation the wheel brakes and/or deploying airbags.

The motion sensors are typically packaged in a module with supporting signal conditioning circuitry, with the module containing one or more accelerometers and/or one or more angular rate sensors. Key to successful operation of the safety control system is proper functioning of the motion sensors and signal conditioning circuitry. Accordingly, it is known to failsafe motion sensor modules by applying a self test to the sensor module. Such self tests typically include applying an input signal to each one of the motion sensors. The self test input signal is generated by the safety control system microprocessor and applied to a self test input that is provided on the motion sensor module. If the motion sensor is operating properly, a fixed offset will appear on the sensor output signal appearing at an output of the sensor module. If the microprocessor does not detect the offset after applying the self test activation signal, it is an indication of a sensor malfunction and the microprocessor will generate an error signal or code. However, during the self test activation, the self test signal may saturate the device, thus limiting the usefulness of the sensor during the self test. Additionally, the frequency of the self test technique may be limited by the bandwidth of the motion sensor module. Therefore, this type of self testing is most often done while the vehicle is standing still, such as upon initial start-up of the vehicle.

Some motion sensor modules, such as the module 10 illustrated in FIG. 1, have a test status port 12 which is connected to a microprocessor (not shown). The test status port 12 changes state either during a self test or if an internal fault is detected. Also shown in FIG. 1 is a sensor module voltage supply port 14 that is connected to the vehicle power supply. An output port 16 at which the sensor output signal appears and a test activation port 18 are also connected to the microprocessor. The microprocessor is operative to apply a self test signal, as described above, to the test activation port 18. Finally, a ground port 20 is connected to the vehicle ground.

The operation of typical self test for the motion sensor module 10 is illustrated by the curves shown in FIG. 2 that represent voltages appearing at the sensor module ports 12, 14, 16 and 18 as a function of time. At $t_0$ the supply voltage V+, which is shown by the curve labeled 24, is applied to the voltage supply port 14. In response, an output voltage, which is shown by the curve labeled 26, builds up on the output port 16, reaching a steady state value at $t_1$. After the output port 16 reaches its steady state value, the test status port 12 goes high at $t_2$, as shown by the curve labeled 28. At $t_3$ a self test activation signal, which is shown by the curve labeled 30, is applied to the test activation port 18 by the microprocessor, which causes the test status port 12 to go low. In response to the test activation signal 30, the output voltage increases, as shown by an offset voltage that appears on the output voltage port 16 and that is labeled 32. The offset voltage 32 on the output voltage port 16 is compared to an acceptable offset voltage range by the microprocessor and, upon the offset voltage remaining within the acceptable range, the sensor is deemed as working satisfactorily. The test activation signal is terminated at $t_4$, with the test activation port 18 going low. Since no problem has been detected with the sensor 10, the test status port 12 goes high while the output voltage decays to the original value, which is reached at $t_5$.

FIG. 2 also illustrates the result of a self test when a fault is present in the sensor module 10. The fault causes the offset voltage at the output port 16 to exceed the acceptable offset voltage range when the test activation signal is applied, as illustrated by the dashed portion of the output voltage labeled 34. Because a fault is present, the test status port 12 remains low after the self test is completed, as illustrated by the dashed portion of the test status voltage that is labeled 36. Upon the test status voltage remaining low, the microprocessor sets an error flag.

In addition to the above described self test being restricted to being applied only when the vehicle is standing still, if the test status port 12 develops a fault, it may not properly indicate that the rest of the components are still functional. For example, if the test status port 12 has an external, or internal, short to the supply voltage, it would remain high and thereby be unable to indicate that a fault is present. Therefore, it would be desirable to provide an alternate approach to fail safe testing of motion sensor modules.

SUMMARY OF THE INVENTION

This invention relates to fail safe test activation for motion sensor modules.

The present invention contemplates a method for failsafe self checking a motion sensor module that includes an output signal port and a test activation port. The motion sensor module being responsive to a first change of state of the test activation port to initiate a sequence of self tests on the sensor module, with the self tests providing a test response signal on the output signal port. Additionally, the first change of state of the test activation port has a first predetermined duration to allow completion of the sequence of self test activations after which the test activation port reverts to its original state. The sensor module also has a test status port that changes state when the test activation port changes state with the status port reverting to its original state when the test activation port reverts to its original state.

The method is characterized by the application of a second change of state to the test activation port, the second change of state having a second predetermined duration that is less than the first predetermined duration corresponding to the first change of state. The test status port is then monitored for a change of state in response to the second change of state being applied to the test activation port and an error signal generated if the test status port does not change status in response to the second change of sate being applied to the test activation port.

Additionally, the error flag is set if the test status port does not change status in response to the second change of state within a third time period having a predetermined duration that is less than the predetermined duration of the second change of state Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 2:
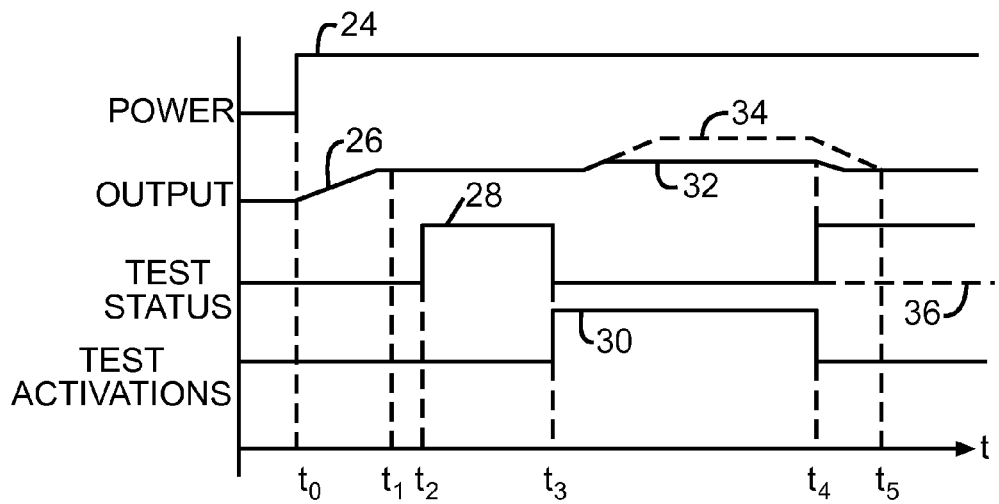
FIG. 2 illustrates voltages that occur during a typical self test of the motion sensor module shown in FIG. 1.

The present invention contemplates performing an abbreviated self test for a very short period that is selected to be just long enough to cause the test status port 12 of a motion sensor module 10 to change state and is much shorter that the time that would be required for prior art the self test voltage 30 shown in FIG. 2. For example, it is contemplated that the self test in accordance with the invention may last less than 10 msec. as compared to approximately 200 msec. needed for the self test shown in FIG. 2. This abbreviated self test will verify the functionality of the test status port, which, in turn, will verify operation of the majority of components included in the motion sensor module 10. By performing the abbreviated self test very quickly, the normal output voltage offset 32 does not have sufficient time to mature. Therefore, the self test contemplated by the present invention may be continuously commanded, even when the vehicle carrying the motion sensor module is moving.

Figure 1:
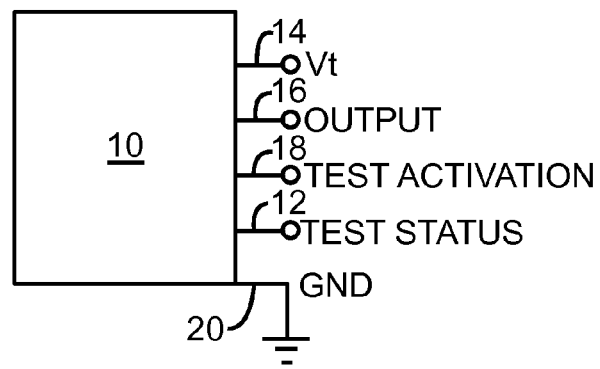
FIG. 1 is a block diagram of a typical prior art motion sensor module.
Figure 3:
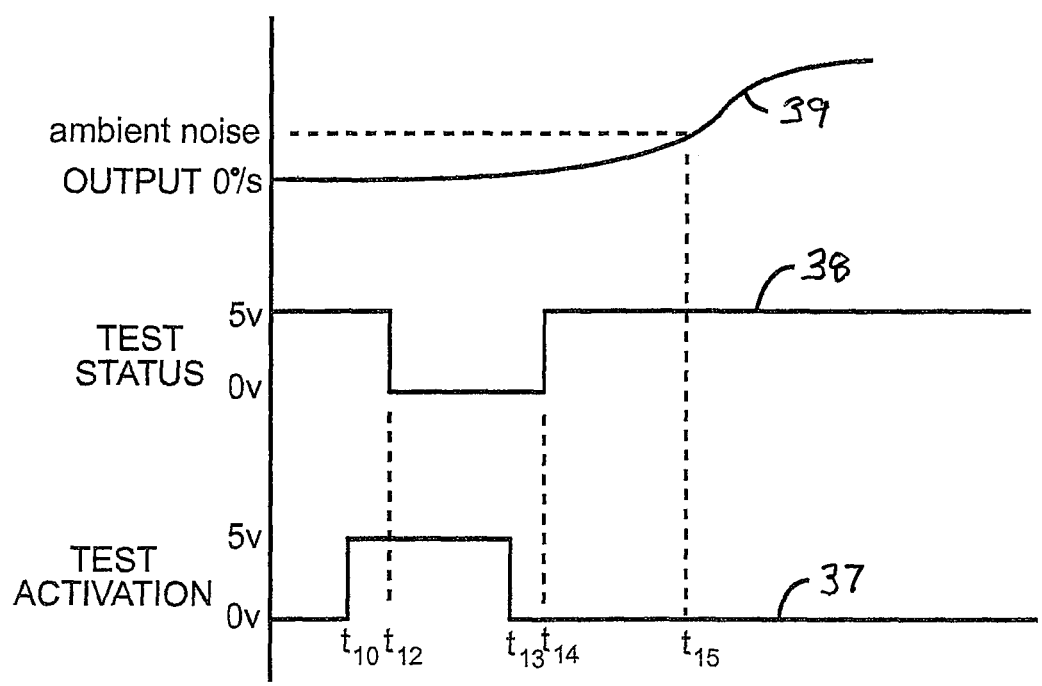
FIG. 3 illustrates voltages that occur during a self test of the motion sensor module shown in FIG. 1 that is in accordance with the invention.

Referring again to the drawings, there is illustrated in FIG. 3 the operation of the self test in accordance with the present invention. Components and waveforms that are similar to components and waveforms shown in FIG. 2 have the same numerical identifiers. To avoid confusion, the self test activation signal 30 shown in FIG. 1 should be considered a first test voltage while the abbreviated self test signal should be consider a second test voltage. In an ideal circuit, the voltage at the test status port 12 changes when the test activation voltage is either applied or removed to the test activation port 18, as illustrated in FIG. 2. However, the present invention takes into account that a short delay may occur before the test status port voltage changes. Therefore, as shown in FIG. 3, a second test voltage 37 having a short duration is applied to the test activation port 18 of the motion sensor module 10 at $t_{10}$ with the test status voltage 38 changing state at a later time $t_{12}$. The present invention compares the delay between the times $t_{12}$ and $t_{10}$ to a delay threshold $\Delta T$, to determine whether the self test has functioned properly. The delay threshold $\Delta T$ is selected a function of the test status port response time.

Accordingly, the invention contemplates monitoring the test status port 12 for a voltage change. If the voltage change does not occur before the elapse of a time period equal to $t_{10}+\Delta T$, it is an indication that there is a fault present in the sensor module 10 and an error flag is set.

Alternately, the invention contemplates determining the difference between the test signal application time $t_{10}$ and the test status port response time $t_{12}$ If the difference is less than, or equal to, the delay threshold $\Delta T$, it is an indication that the test status port 12 is functioning properly. However, if the difference between the test activation signal application time $t_{10}$ and the test status port response time $t_{12}$ exceeds the delay threshold $\Delta T$, it is an indication that there is a fault present in the sensor module 10 and an error flag is set.

The change in the output voltage that would result if the second test voltage 37 remained applied to test activation port 18 after $t_{13}$ is shown by the curve labeled 39 in FIG. 3. As shown in the figure, the output voltage 39 appearing on the output port 16 has an initial value related to the output of the sensor. In FIG. 3, the initial sensor output has a voltage representing a value of 0°/second, as would be generated by a yaw rate sensor. Alternately, the output voltage may represent an acceleration detected by an accelerometer (not shown). The change in the output voltage 39 begins to have a significant value after $t_{15}$, which is well after the test voltage 37 actually returns to zero. Prior to $t_{12}$, the change in the output voltage 39 is less than the ambient noise level, which is shown as a dotted line in FIG. 3. Hence, the self test in accordance with the present invention does not affect the output voltage 39. Typically, the second test signal duration, $t_{13}-t_{10}$ is 2 milliseconds; however, other time periods may be utilized. Also, the time period between the application of the second test voltage at time $t_{10}$ and the potential response of the sensor output port voltage 39 at $t_{15}$ is typically 3 milliseconds; however, again a different time period may apply.

In order to avoid a random voltage error or noise causing an error flag to be set, the invention also contemplates counting the number of times a fault is detected. Thus, the invention contemplates using four or five consecutive fault occurrences as criteria for setting an error flag. However, the invention may be practiced with more or less consecutive fault occurrences causing the error flag to be set, or with the error flag being set after only one fault occurrence. Additionally, the test activation signals are typically in the range of zero and five volts, as provided by a regulated power supply (not shown). However, the microprocessor may be limited to maximum input voltages of about 3.3 volts. When this is the case, the invention contemplates providing a level shifter, or voltage divider, (not shown) that would be connected between the motion sensor output port 16 and the corresponding microprocessor input port. The level shifter would be operable to reduce the motion sensor output port voltage to an appropriate level for application to the microprocessor.

Figure 4:
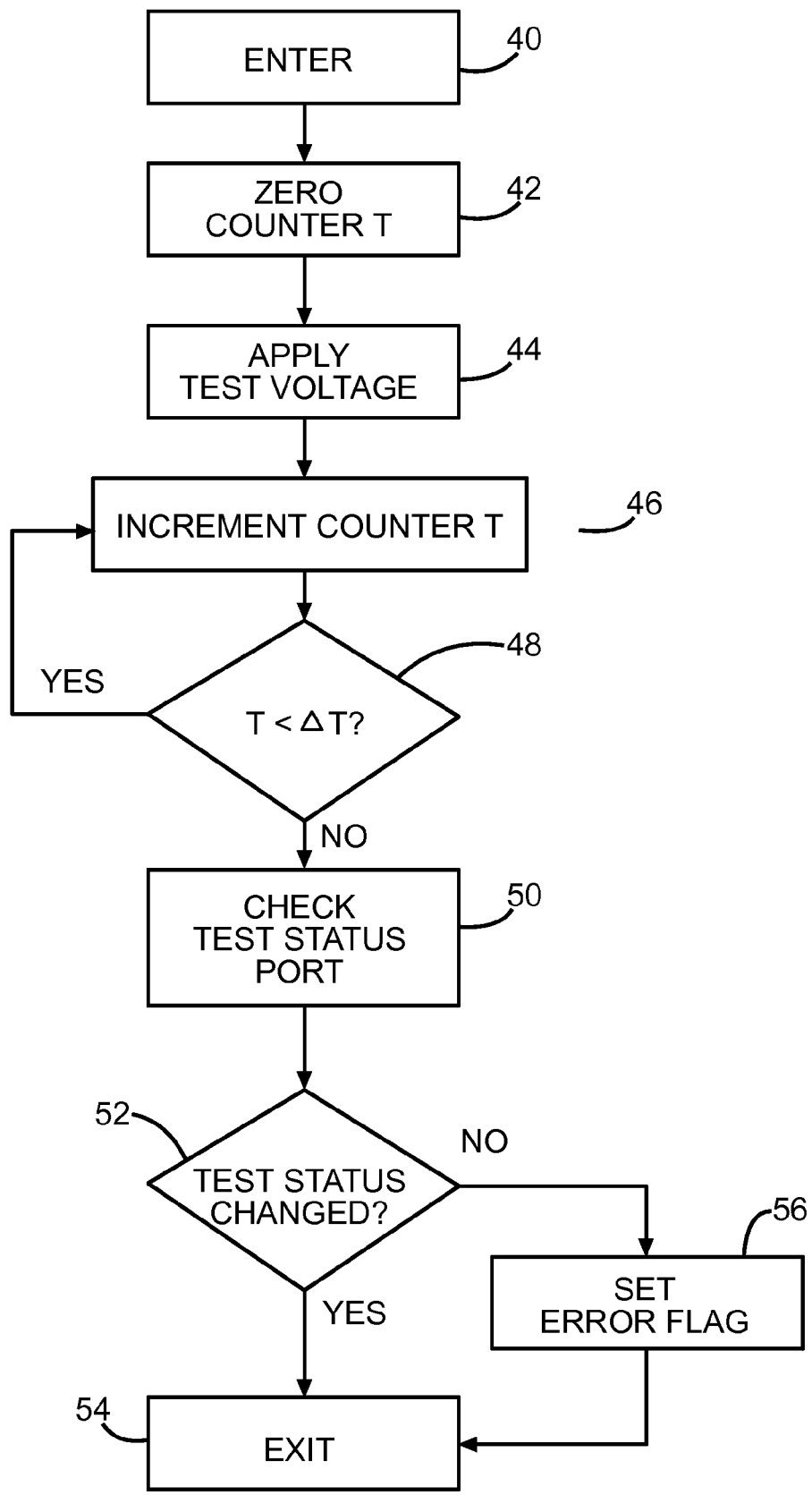
FIG. 4 is a flow chart that illustrates an algorithm for performing the self test shown in FIG. 3.

A flow chart illustrating an algorithm for the operation of the invention is shown in FIG. 4. The algorithm is entered through block 40 and proceeds to functional block 42 where a counter, T, is set to zero. The algorithm then advances to functional block 44 where a test voltage is applied to test activation port 18 at $t_{10}$. As described above, the test voltage has a short duration and ends at $t_{13}$. The algorithm then continues to functional block 46 where a time delay is implemented and the counter is incremented. The increment may be unity, if iterations are counted, or a time period, such as, for example, 0.5 milliseconds. The algorithm then advances to decision block 48 where the current value of the counter T is compared to a threshold $\Delta T$ that represents the expected time delay for a change of status at the test status port 12, that is, the difference between $t_{12}$ and $t_{10}$, if a timed increment is utilized in functional block 46. If an increment counter is used in functional block 46, the threshold would represent the number of iterations needed to reach the expected time delay for a change of status at the test status port. If the current value of the counter T is less than the threshold $\Delta T$, the algorithm transfers to functional block 46 where the counter is again incremented.

If, in decision block 48, the value of the counter T is greater than, or equal to, the threshold $\Delta T$, sufficient time has passed for the test status port to change, if the sensor module is operating properly, and the algorithm transfers to functional block 50. In functional block 50, the voltage appearing on the test status port 12 is checked for a change in status. The algorithm then advances to decision block 52 where it is determined whether of not a change of status at the test status port 12 has occurred. If the status has changed, the sensor module is operating properly, and algorithm transfers to exit block 54. If, in decision block 52, the status has not changed, the sensor module is not operating properly and the algorithm transfers to functional block 56 where an error flag is set. The algorithm then exits through block 54.

As described above, the invention also contemplates counting a predetermined number of consecutive errors before setting an error flag. An alternate embodiment of the algorithm described above that includes this feature is shown in FIG. 5 where any blocks that are the same as shown in FIG. 4 have the same numerical identifiers. The algorithm is again entered through functional block 40 and proceeds to functional block 58 where a counter C that represents the number of consecutive errors detected is set to zero. The algorithm then continues to functional block 44 where a test voltage is applied to test activation port 18 at $t_{10}$. The algorithm next proceeds to functional block 60 where a time delay is applied, as described above. Alternately, a second counter may be utilized with the blocks 46 and 48 from FIG. 4 substituted for functional block 60. The algorithm continues to functional block 50.

In functional block 50, the voltage appearing on the test status port 12 is checked for a change in status. The algorithm then advances to decision block 52 where it is determined whether of not a change of status at the test status port 12 has occurred. If the status has changed, the sensor module is operating properly, and algorithm transfers back to functional block 58 where the counter C is again zeroed and a new increment of the test begun. If, in decision block 52, the status has not changed, the sensor module is not operating properly and the algorithm transfers to functional block 62 where the counter C is incremented. The algorithm then advances to decision block 64.

In decision block 64, the counter C is compared to an error threshold $\Delta C$ that represents the maximum allowable number of consecutive errors. The error threshold $C_{MAX}$ is preselected to exclude false setting of the error flag. Thus the value may be, for example, 5: however, the invention also may be practiced utilizing other values for $C_{MAX}$. If the counter C is less than $C_{MAX}$, the algorithm transfers back to functional block 44 to begin another iteration. If, in decision block 62, the counter C is greater than or equal to $C_{MAX}$, the algorithm transfers to functional block 54 where an error flag is set. The algorithm then exits through block 54.

Figure 5:
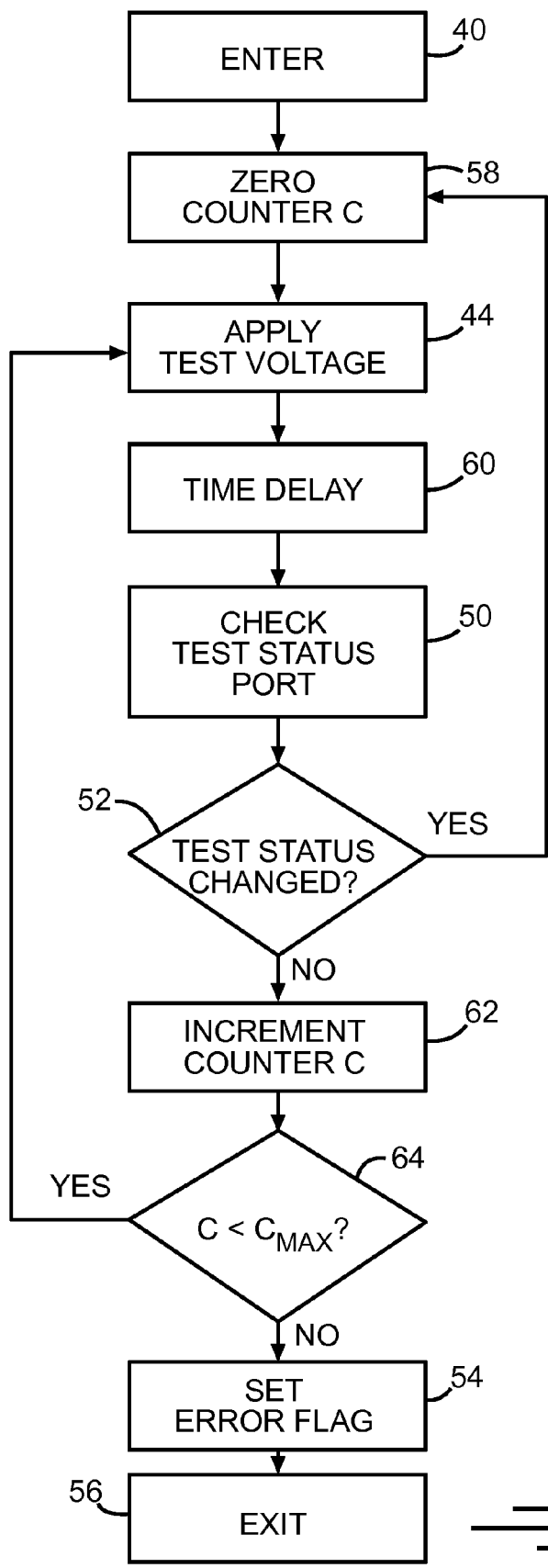
FIG. 5 is a flow chart that illustrates an alternate embodiment of the algorithm shown in FIG. 4

As shown in FIG. 5, the algorithm, once entered, runs continuously until the error flag is set. The invention also may be practiced with a decision block to continue added to FIG. 5 (not shown), to allow exiting the algorithm without having set the error flag. The continuation could be determined by other factors, such as, for example the total time that the algorithm has been running, or an operating condition of the vehicle, such as, for example, the vehicle engine running, the transmission in gear, or the ignition on; however, other criteria may also be utilized.

Figure 6:
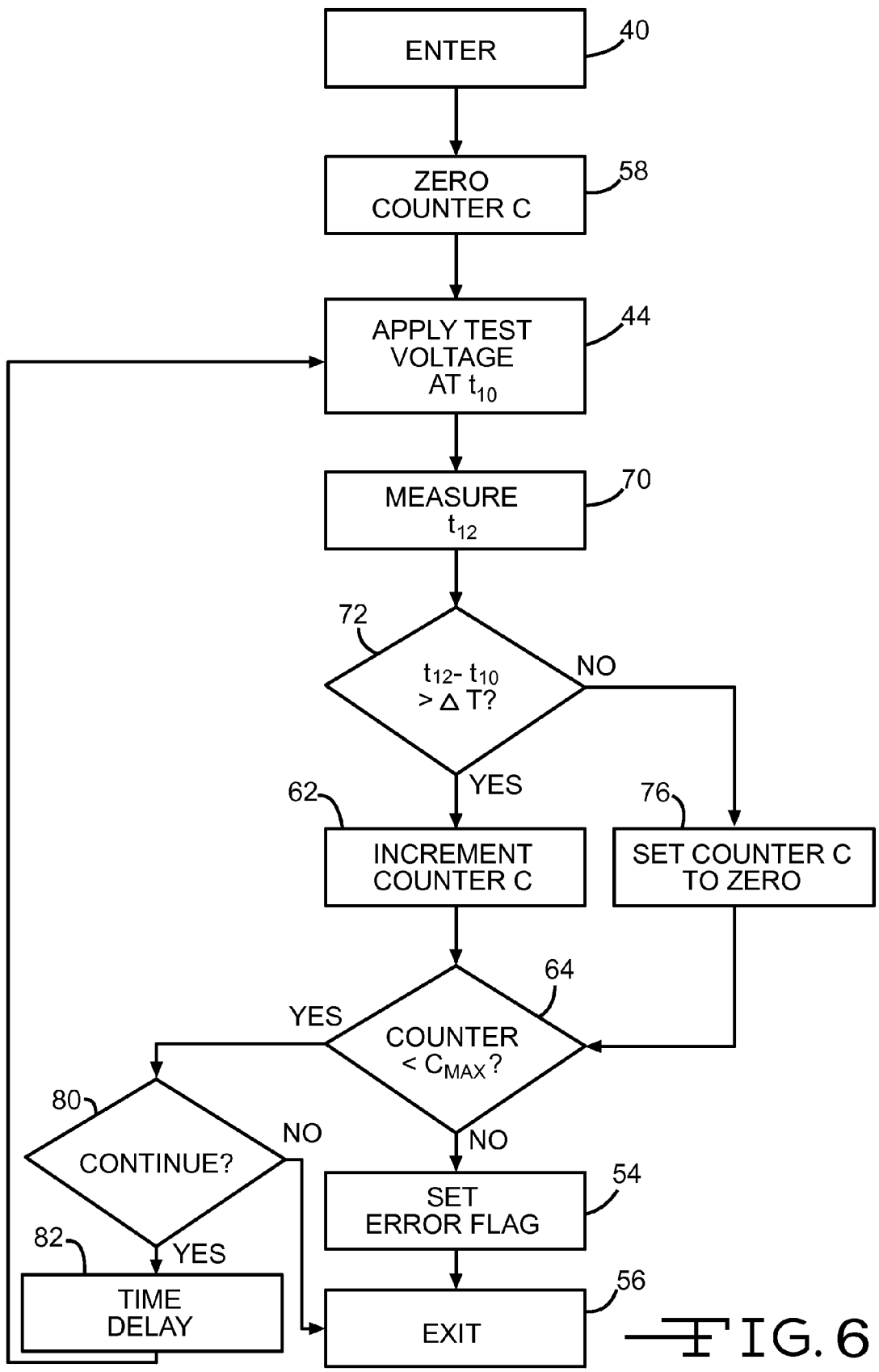
FIG. 6 is a flow chart that illustrates an alternate embodiment of the invention.

Another alternate embodiment of the invention is illustrated by the algorithm shown in FIG. 6 where blocks that are the same as blocks shown in FIGS. 4 and 5 have the same numerical designators. In the embodiment shown in FIG. 6, the elapsed time period between the time of application of the test voltage to the test activation port 18 and the time at which status of the voltage on the test status port 12 changes is compared to a time delay threshold $\Delta T$. If the elapsed time period is greater than $\Delta T$, the sensor module is deemed to not be operating properly.

The algorithm shown in FIG. 6 is entered through block 40 and proceeds to functional block 58 where a consecutive error counter C is set to zero. The algorithm then continues to functional block 44 where the test voltage is applied to test activation port 18 at $t_{10}$. As described above, the test voltage has a short duration and ends at $t_{13}$. The algorithm then continues to functional block 70 where the voltage appearing on the test status port 12 is monitored and the value $t_{12}$ representing the time at which the test status response is detected is noted. Also, the difference between $t_{12}$ and $t_{10}$ is calculated in functional block 70. The algorithm then advances to decision block 72.

In decision block 72, the difference between $t_{12}$ and $t_{10}$ is compared to the delay threshold $\Delta T$. If the difference exceeds the delay threshold $\Delta T$, the algorithm transfers to functional block 62 where the consecutive error counter C is incremented by one. The algorithm then continues to decision block 64. If, in decision block 72, the difference is less than or equal to the delay threshold $\Delta T$, the algorithm transfers to functional block 76 where the counter is reset to zero. The algorithm then continues to decision block 64.

In decision block 64, the value of the counter is compared to the maximum allowable number of consecutive errors, $C_{MAX}$. If the value of the counter is greater than or equal to the maximum allowable number of consecutive errors $C_{MAX}$, the algorithm transfers to functional block 54 where an error flag is set. The algorithm then exits through the block labeled 56. If, in decision block 64, the value of the counter is less than the maximum allowable number of consecutive errors $C_{MAX}$, the algorithm transfers to decision block 80.

In decision block 80, the algorithm determines whether or not to continue. The criteria for continuing may be determined by observing a vehicle operating condition, such as, for example, the vehicle engine running, the transmission in gear, or the ignition on. Alternately, continuation could be determined by the total time that the algorithm has been running; however, other criteria may also be utilized. If it is determined in decision block 80 to continue, the algorithm advances to functional block 82 where a time delay is imposed before beginning the next iteration of the algorithm. A typical iteration time delay may be 50 milliseconds; however longer or shorter time delays may be utilized. It is noted that typical prior art self tests take approximately 140 milliseconds, so, again, it is possible to perform the self test contemplated by the invention while the vehicle is moving without affecting the accuracy of the sensor module output signal. Once the time delay has expired, the algorithm returns to functional block 44 and begins the next test iteration. If, in decision block 80 it is determined not to continue, the algorithm then exits through the block labeled 56.

It will be appreciated that the algorithms illustrated in FIGS. 4 through 6 are intended to be exemplary and that the invention also may be practiced with variations of the algorithms or with different algorithms. For example, in FIG. 6, the functional blocks labeled 62 and 76 and the decision block labeled 74 may be removed is it is desired to set the error flag upon detection of a single fault occurrence (not shown). Similarly, blocks 30 and 82 may be removed and the algorithm structured as shown in FIG. 5 with the YES branch of decision block connected to functional block 44 to provide continuous testing (not shown).

As described above for the algorithm shown in FIG. 6, the invention uses the initial response to the application of the test activation voltage to determine whether the sensor 10 is operating properly. However, the invention also contemplates using the response detected at the test status port 12 following the end of the test activation signal at $t_{13}$. Thus the difference between the time that passes between the test activation signal 30 returning to zero at $t_{13}$ and the time at which the test status signal 28 again goes high at $t_{14}$ may be compared to an end of test delay threshold that may, or may not, be the same as the delay threshold $\Delta T$ described above. Additionally, the end of test delay criteria may be applied solely, or in combination with the start of test delay criteria, described above.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. Thus, while the invention has been illustrated with voltages going from low to high and high to low, the invention also may be practiced with the voltages going in the opposite direction, that is, the invention contemplates using a change in the state of the voltage. Additionally, the invention further contemplates utilizing voltages that change between zero and a negative value or that change between positive and negative values.

What is claimed is:

1. A method for failsafe self checking a motion sensor module comprising the steps of:
   (a) providing a motion sensor module having an output signal port and a test activation port, the motion sensor module being responsive to an application of a first test voltage to the test activation port to initiate a sequence of self tests within the sensor module, the self tests providing a test response signal on the output signal port, the first test voltage having a first predetermined duration to allow completion of the sequence of self tests after which the test activation port voltage reverts to its original value, the motion sensor module also having a test status port that changes voltage in response to the first test voltage being applied to the test activation port, the state of the test status port voltage also reverting to its original value in response to the test activation port voltage reverting to its original value;
   (b) applying a second test voltage to the test activation port, the second test voltage having a second predetermined duration that is less than the first predetermined duration of the first test voltage;
   (c) monitoring the test status port for a voltage in response to the second test voltage being applied to the test activation port; and
   (d) generating an error signal if the test status port voltage does not change in response to the second test voltage being applied to the test activation port.

2. The method according to claim 1 wherein the error signal is generated in step (d) if the test status port voltage does not change status in response to the second test voltage within a third time period having a predetermined duration that is less than the second predetermined duration corresponding to the second test voltage.

3. The method according to claim 2 wherein the third time period is measured from the beginning of the second time period.

4. The method according to claim 3 wherein step (c) also includes counting the consecutive number of times that test status port voltage does not change within the third time period and proceeding to step (d) only when the number of consecutive times that test status port voltage does not change within the third time period exceeds a predetermined threshold.

5. The method according to claim 4 wherein the motion sensor includes at least one inertia sensor.

6. The method according to claim 4 wherein the motion sensor includes at least one accelerometer.

7. The method according to claim 4 wherein the motion sensor includes at least one angular rate sensor.

8. The method according to claim 4 further including a voltage level shifter connected between the sensor module output port and a corresponding microprocessor input port.

9. The method according to claim 2 wherein the third time period is measured from the end of the second time period.

10. The method according to claim 1 wherein step (c) also includes counting the consecutive number of times that test status port voltage does not change in response to the second test voltage being applied to the test activation port and proceeding to step (d) only when the number of consecutive times that test status port voltage does not change within the third time period exceeds a predetermined threshold.

11. The method according to claim 1 wherein the error signal is generated only if the test status port voltage does not change in response to the second test voltage being applied to the test activation port within a third predetermined time period which is less than the second predetermined time duration.

12. A method for failsafe self checking a motion sensor module of a vehicle electronic safety control system having a test activation port, an output signal port, and a test status port, wherein the motion sensor module is responsive to the application of a test voltage at the test activation port for (1) initiating a sequence of self tests within the motion sensor module, (2) providing a test response signal at the output signal port, and (3) changing a voltage at the test status port, the method comprising the steps of:
   (a) applying a first test voltage to the test activation port of the motion sensor module, the first test voltage having a first predetermined duration to allow completion of a sequence of self tests within the motion sensor module, after which the test activation port voltage reverts to its original value;
   (b) applying a second test voltage to the test activation port of the motion sensor module, the second test voltage having a second predetermined duration that is less than the first predetermined duration of the first test voltage;
   (c) monitoring the test status port of the motion sensor module for a voltage in response to the second test voltage being applied to the test activation port of the motion sensor module; and
   (d) generating an error signal if the voltage of the test status port of the motion sensor module does not change in response to the second test voltage being applied to the test activation port of the motion sensor module.

* * * * *